United States Patent [19]

Debacque et al.

[11] Patent Number: 5,122,054
[45] Date of Patent: Jun. 16, 1992

[54] DEVICE FOR STOPPING A RADIANT BURNER AUTOMATICALLY IN THE EVENT OF IGNITION

[75] Inventors: Patrick Debacque, La Chapelle d'Armentias; Gabriel Coppin, Armentias, both of France

[73] Assignee: Solaronics Vaneecke, Armentieres, France

[21] Appl. No.: 616,439

[22] Filed: Nov. 21, 1990

[30] Foreign Application Priority Data

Nov. 21, 1989 [FR] France ................. 89 15252

[51] Int. Cl.⁵ ............................................. F23D 14/82
[52] U.S. Cl. ................................. 431/346; 431/21; 431/326; 126/92 AC
[58] Field of Search ............. 431/346, 21, 326, 328; 126/92 R, 92 AC, 92 B, 287.5; 122/504.1, 504.3

[56] References Cited

U.S. PATENT DOCUMENTS 2,659,426 11/1953 Rowell ........................ 431/21

FOREIGN PATENT DOCUMENTS

| | | |
|---|---|---|
| 1526013 | 7/1970 | Fed. Rep. of Germany . |
| 2453078 | 5/1976 | Fed. Rep. of Germany . |
| 2304013 | 10/1976 | France . |
| 596093 | 6/1959 | Italy ........................ 431/21 |
| 56-154571 | 9/1981 | Japan . |

Primary Examiner—James C. Yeung
Attorney, Agent, or Firm—Bachman & LaPointe

[57] ABSTRACT

The invention provides a device for shutting off a gas or air/gas mixture supply port of a radiant burner so as to cause it to stop automatically in the event of ignition at the rear, this device being of the type comprising a deformable temperature-detecting part, the deformation of which brings about the movement of a shut-off part intended for shutting off the port in the event that a specific temperature is detected, wherein the detection part is arranged in the distribution chamber of the radiant burner.

14 Claims, 1 Drawing Sheet

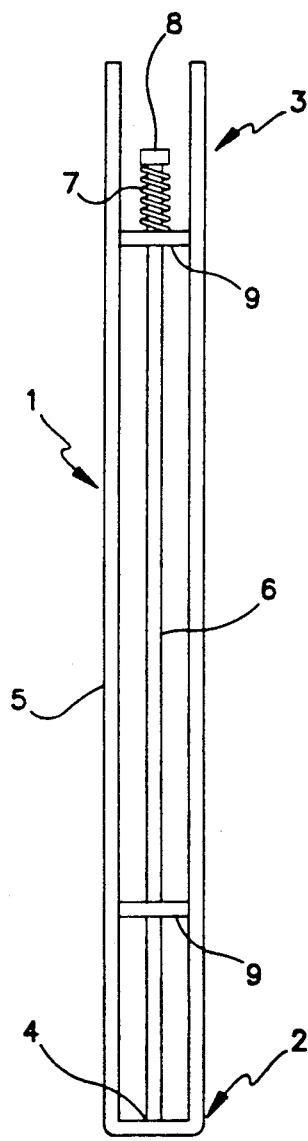
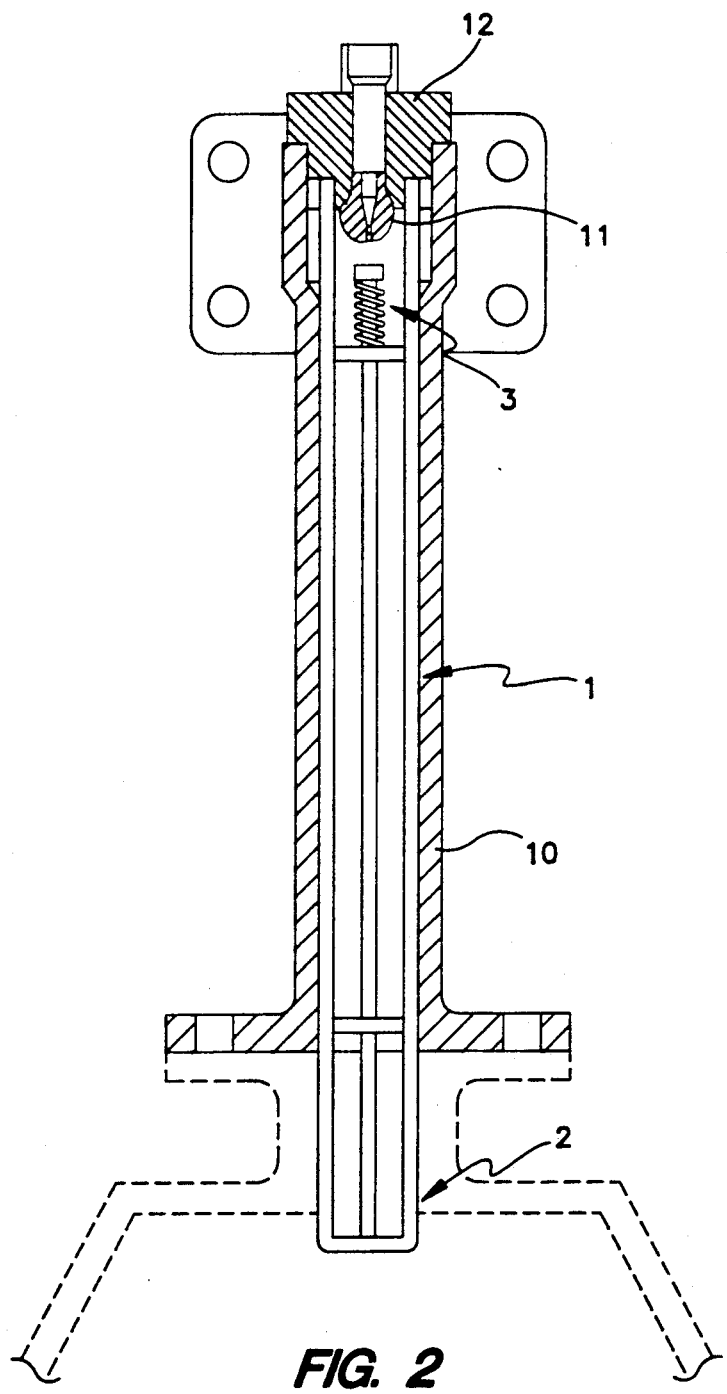
FIG. 1  FIG. 2

DEVICE FOR STOPPING A RADIANT BURNER AUTOMATICALLY IN THE EVENT OF IGNITION

BACKGROUND OF THE INVENTION

The present invention relates to a device for use in combination with a radiant burner which stops automatically the flow of fuel to the burner in the event of ignition at the rear of the burner in the fuel distribution chamber thereof.

Radiant burners are used, for example, in drying installations or in installations for correcting the humidity profile of a paper or textile sheet in continuous movement.

The general principle of radiant burners is to convert most of the energy supplied in convective form into a radiant energy as a result of the combustion of a gas.

It should be noted that, for safety reasons, most modern radiant burners operating with gas are of the separate air/gas type. The air and gas are mixed at the last moment just downstream of the radiant burner in the mixing chamber. A radiant burner of this type therefore comprises an air supply, a gas supply, a mixing chamber or tube, a mixture distribution chamber and a combination head or support.

At the outlet of the distribution chamber, they have one or more plates which are made of refractory material of good thermal insulation (ceramic, ceramic or metal fiber, etc.) and the function of which is, on the one hand, to support the combustion and, on the other hand, to convert into infrared radiation of the fraction of the combustion heat recovered as a result of contact with the hot gases.

There can if appropriate, be associated with this plate or these plates a screen which recovers some of the enthalpy still contained in the combustion products and which converts it into additional radiant energy.

Combustion therefore takes place in the region of the plate, more specifically on its front surface, after the gaseous mixture has flowed the latter.

One of the conventional faults of a radiant burner is the phenomenon known as combustion burnback or rear ignition. During such a phenomenon, combustion occurs in the distribution chamber at the rear of the plate, whereas it should normally take place on the front face.

There are various causes of ignition and these can be classified in three categories.

The ignition can be brought about by a combustion burnback through the front face of the plate. In some instances, in fact, combustion can burnback through the plate and take place at the rear of the latter, for example because of an excessive increase in the surface temperature of the plate attributable to, among other things, the presence of a reflector facing the burner, to the partial or complete shut-off of the surface of the plate, to an excessive preheating of the mixture, to an oxygen enrichment, to particular cycling configurations during which the radiant burner is modulated in terms of temperature and power, etc. This combustion burnback through the front face of the plate can also be brought about by defects of the latter, for example by a poor homogeneity or the aging of its component material (in respect of the porosity, thermal conductivity, etc.).

Another cause of ignition is leaks at the rear of the radiant burner. In the event of leakage, the mixture will burst into flames on contact with the hot walls of the burner, and in some instances the combustion will burn-back through the leak-producing orifice to the rear of the plate of the radiant burner. There can be many causes of leakage to the rear, for example wearing of the gaskets after aging at the end of the lifetime of the radiant burner, manufacturing defect, etc.

The ignition of the mixture at the rear of the radiant burner can also be brought about by bringing the mixture in contact with a hot spot or a spark before it is introduced into the head of the radiant burner. In fact, some ignition systems of radiant burners comprise an ignition electrode fed by means of a branch connected laterally to the mixer tube, and if the ignition spark is not produced at the appropriate place, namely at the end of the pilot flame, the ignition can be transmitted to the interior of the mixer tube.

Now the consequences of ignition at the rear can be serious if the burner affected is not stopped quickly. In fact, the entire power will be released at the rear into the distribution chamber which will be heated considerably up to 800° to 1000° C. The rear environment (wiring, etc.) therefore risks being damaged, and fires can be caused if inflammable materials are present in the vicinity (papers, plastic films, etc.). Finally, after this operating state has persisted for a few days, the casing of the distribution chamber of the radiant burner risks opening, thereby exposing the flame.

In the traditional systems for assembling radiant burners in an arch or panel-mounted, the burners were accessible from the rear. It was therefore possible, during normal maintenance operations, to identify the defective radiant burners quickly and, if necessary, to change them.

Increasingly now, completely encased batteries of radiant burners are being produced, and the visual detection of faults is consequently difficult, if not impossible.

It is therefore necessary to develop detection techniques which do not require a direct view of the rear of the radiant burners. In particular, existing solutions employ temperature probes or infrared detectors. Particularly, temperature probes are installed on the casing of the distribution chamber and are connected by wiring to an electronically controlled solenoid valve either arranged directly on each of the burners or connected to the existing solenoid valve controlling the complete row of burners.

The solutions described above have some disadvantages. They are generally heavy and costly systems requiring the installation of special wiring and electronics. In the simplest instance of connection to the existing solenoid valve of the row radiant burners, in the event of detection it is necessary to cut off an entire row of radiant burners while waiting for the replacement of the defective radiant burner. Now it is quite clear that the complete shutdown of a row of radiant burners for the repair period is detrimental to the performance of the installation.

The document DE-A-1,526,013 describes and illustrates a mechanical device for shutting off the gas supply port of a radiant burner of the type possessing an element with a controlled fusion temperature which is arranged upstream of the mixing chamber and which is connected to a shutter, the closing element of which is stressed elastically in the shut-off direction and is retained in the open position by the element having a controlled fusion temperature.

This device is effective, but it acts only when a flame flashback occurs and reaches the mixing chamber. For this, it requires a complex arrangement, the purpose of which is to stabilize the flame flashing back into the mixing chamber in order to cause the fusion of the element. This arrangement is complex to produce and unreliable insofar as it is based on a balance of the velocities of the gas flow and of the flashback flame.

SUMMARY OF THE INVENTION

To overcome these disadvantages, the invention provides a device for shutting off a gas or air/gas mixture supply port of a radiant burner in order to stop it automatically in the event of ignition at the rear, this device being of the type comprising a deformable temperature-detecting part, the deformation of which brings about the movement of a shut-off part intended for shutting off the port in the event that a specific temperature is detected, wherein the detection part is arranged in the distribution chamber of the radiant burner.

This mechanical device reacts automatically in the distribution chamber during an abnormal rise in temperature and as a result of a movement transmission along the mixer brings about the direct shut-off of a gas injector, thus preventing the subsequent formation of an air/gas mixture.

By virtue of this device, no action on the functional parts of the burner is necessary, and, in fact, it is completely independent of these, its action being limited to shutting off the gas-injection nozzle. It should be noted that, in the most frequent instance of a burner of the separate air/gas type, a device shutting off the air/gas mixture would not function. In fact, a shut-off of the mixer tube downstream of the air and gas supplies would cause gas to be introduced into the air, or vice versa, depending on the pressure difference between the air supply conduit and the gas supply conduit. The device must therefore shut off the gas injector directly.

The device according to the invention is very easy to install and is of great simplicity, there is no need for any special adaptation and no complicated electronics have to be provided.

Thus, any problem of the failure of a control device is eliminated and the device is especially reliable.

For this purpose, the present invention provides a process for arranging a preferably radiant burner so that it stops automatically in the event of ignition at the rear, notable in that it involves shutting off the gas or air/gas mixture supply in response to a temperature rise in the distribution chamber of the radiant burner by means of a device installed directly inside the radiant burner.

Where a radiant burner of the air/gas mixture type is concerned, the intake of this mixture is shut off; as regards a radiant burner of the separate air/gas type, only the gas intake is shut off, for the reasons described above.

This device can be installed in the radiant burner from above by disassemblying the gas or gas/air mixture injector; it can also be installed in the radiant burner from below by disassemblying the distribution chamber.

The present invention also provides a shut-off device, in which the deformable temperature-detecting part intended to be arranged in the said chamber and the shut-off part intended to shut off the port are mounted on the common fixed frame.

According to the third embodiment, the said detection part is deformable by means of an element with a controlled fusion temperature. This element with a controlled fusion temperature can be a soldered joint, a weld or a prefabricated stapling piece. As a result of these arrangements, only the element with the controlled fusion temperature is destroyed or deformed during the temperature rise, and the repair of the shut-off device is especially simple and inexpensive.

The deformable detection part can also be an element made of shape-memory metal. In this case, there is no need for repair inasmuch as the element resumes it initial form after cooling to the normal operating temperature.

Preferably, the element with a controlled fusion temperature connects the fixed frame and a junction piece connected to the frame movably and supporting the shut-off element. Thus, the destruction of the element with a controlled fusion temperature brings about the automatic movement of the junction piece in relation to the fixed frame and the automatic shut-off of the port.

To obtain this automatic movement, the junction piece is preferably stressed elastically, and more specifically this elastic stress is preferably obtained by means of a spring compressed between part of the fixed frame and an annular collar located on the junction element.

According to a preferred embodiment, this annular collar forms the shut-off bearing surface. It can also be independent of this, in which case the shut-off bearing surface is arranged on the junction at the end of the latter independently of the annular stop collar of the spring. It is clear that any other arrangement of the spring comes within the scope of the present invention.

Preferably, the frame is a metal strip bent in the form of a safety pin, the branches of which are connected by means of at least one spacer, this or these having an orifice, through which is guided the junction piece formed from a metal rod, one end of which is fastened to the base of the pin by means of the element with a controlled fusion temperature and the other end of which is formed from an annular collar constituting the shut-off bearing surface, the spring being compressed, in the inactive state, between a spacer and the annular collar of the junction rod.

The preferred use of this shut-off device is to provide a device for stopping a preferably radiant burner automatically in the event of ignition at the rear. For this purpose, the shut-off device is arranged in the mixer in such a way that the deformable detection part is located in the distribution chamber of the burner, where rear ignition is liable to occur, and in such a way that the shut-off part is located in the vicinity of the head of the gas injector, so that it shuts off the latter in the active state.

BRIEF DESCRIPTION OF THE DRAWINGS

The invention is described in more detail below by means of drawings illustrating only one particular embodiment.

FIG. 1 shows a front view of a preferred embodiment of the shut-off device according to the invention.

FIG. 2 shows a radiant-burner injector equipped with such a shut-off device, the injector being shown in a section taken along a vertical longitudinal plane of symmetry.

DETAILED DESCRIPTION

As can be seen from FIG. 1, this device comprises a so-called detection part or sensing means 2 deformable by fusion, in the lower part in the example shown, and, in the upper part, a shut-off part or stop means 3 which is intended for closing a port.

The sensing part 2 is deformable by fusion by means of an element with a controlled fusion temperature. In the example illustrated, this element consists of a soldered joint or of a weld 4 connecting frame member 5 and metal rod 6. According to alternative versions (not shown), this soldered joint or weld can be replaced by a prefabricated independent fastening piece of the staple type which would fasten the elements 5 and 6 and which would consist of a material fusing at the specific temperature, so as to be destroyed, or by a piece made of shape-memory metal.

Elements 5 and 6 consist respectively of a frame 5 and of a metal rod or junction piece 6 releasably connected to the frame by sensing part 2 and, at the same time is guided on the latter by spacers 9. This junction piece 6 supports, at its upper end, a shut-off bearing surface or sealing plug 8 intended to be laid against the port or sealing plug to be shut off. For this purpose, the junction piece 6 is stressed elastically by a helical spring or activating means 7 in order to bring the shut-off bearing surface 8 into the active closing position when the junction piece 6 is released from the frame 5 at 4. Thus, in the inactive position, the helical spring 7 is compressed between part of the frame 5, preferably the spacer 9, and an annular collar of the junction element 6. According to the exemplary embodiment, this annular collar forms the shut-off bearing surface 8. According to an alternative embodiment, the annular collar retaining the spring 7 can be independent of the shut-off bearing surface 8, that is to say, for example, located underneath the latter, in which case the junction piece 6 possesses, in relation to the example illustrated, an extension directed upwards and supporting at its end the shut-off bearing surface.

The frame 5 preferably consists of a metal strip bent in the form of a safety pin, the branches of which are connected by means of at least one spacer 9; according to the example illustrate, the spacers 9 are two in number and each have an orifice, through which is guided the junction piece 6 which, in this case, consists of a metal rod. One end of the metal rod 6 is therefore fastened to the base of the pin of the frame 5 by means of the part 4 with a controlled fusion temperature, and its other end supports the shut-off bearing surface 8. Consequently, in the inactive state, the helical spring 7 is compressed between an upper spacer 9 and the shut-off bearing surface 8. In the event that the fastening 4 is destroyed by fusion, the rod 6 slides under the effect of the spring 7; the spring 7 and the size of the rod 6 are selected so that, during this sliding, the shut-off bearing surface 8 is laid against the port, the spring 7 then still being sufficiently compressed to exert pressure on the port in question.

The shut-off bearing surface 8 has a geometry matched to that of the seat of the port to be shut off. Where a conical port is concerned, it will advantageously consist of a complementary inverted cone.

FIG. 2 illustrates the preferred use of the shut-off device already described. This device is installed in the mixer tube of a radiant burner and is intended for stopping the burner automatically in the event of rear ignition in the distribution chamber.

For this purpose, the dimensions of the shut-off device are selected so that a frame 5 is inserted into the mixer tube 10 and can be fastened there. The length of the frame and the composition of the part deformable by fusion and of the shut-off part are such that the part 2 is located in the distribution chamber and the shut-off part 3 is arranged so as, in the active position, to shut off the injector head 11 supported by the injector door 12.

In the event of rear ignition, therefore, the device shuts off the injection head 11, thus blocking the intake of gas, and in this case only the air intake (not shown) remains active and the operation of the defective burner is interrupted.

After the burner has been repaired, therefore, it is sufficient to carry out a new fastening with a controlled fusion temperature of the elements 5 and 6 or to replace the worn shut-off device with a new one. These especially simple operations can be carried out on the spot.

The normal operating temperature in the distribution chamber of a radiant burner is approximately 200° C. Depending on the tolerance margin allowed in the distribution chamber, the fusion temperature of the fastening element 4 will therefore be within a range of 200° C. to 800° C. According to a preferred embodiment, the soldered joint 4 will be made of silver with a fusion temperature of between 600° and 620° C., and the frame and junction piece will be made of metal, preferably stainless steel.

We claim:

1. In a radiant burner having a fuel feed nozzle, a mixing chamber downstream of said fuel feed nozzle and a fuel distribution chamber downstream of said mixing chamber, a device for shutting off the flow of fuel to said mixture distribution chamber of said radiant burner, the improvement which comprises said device having sensing means located within said fuel distribution chamber for sensing an undesirable increase in temperature within said fuel distribution chamber, stop means associated with said sensing means for stopping the flow of fuel from said fuel feed nozzle to said mixing chamber and said mixture distribution chamber, and activating means associated with said sensing means and said stop means for activating said stop means for stopping the flow of fuel from said fuel feed nozzle in response to the sensing of an undesirable increase in temperature with said fuel distribution chamber by said sensing means.

2. A device according to claim 1 wherein said sensing means, said stop means and said activating means are mounted in a frame member.

3. A device according to claim 2 wherein said frame member is mounted within said mixing chamber.

4. A device according to claim 3 wherein a portion of said frame member projects into said fuel distribution chamber.

5. A device according to claim 4 wherein said sensing means is mounted within said portion of said frame member.

6. A device according to claim 5 wherein said stop means comprises a plug for sealing said fuel feed nozzle.

7. A device according to claim 6 wherein said activator means includes a spring for biasing said plug against said fuel feed nozzle.

8. A device according to claim 2 wherein said stop means is mounted on a metal rod guidably mounted in said frame member.

9. A device according to claim 8 wherein said rod is releasably fixed to said frame member by said sensing means.

10. A device according to claim 9 wherein said sensing means comprises a controlled fusion temperature joint.

11. A device according to claim 10 wherein said activator means includes a spring for biasing said plug against said fuel feed nozzle.

12. A device according to claim 11 wherein said frame member is provided with a plurality of spacers for guiding said metal rod.

13. A device according to claim 1 wherein said sensing means comprises a controlled fusion temperature joint.

14. A device according to claim 1 wherein said sensing means comprises a temperature sensitive shape-memory metal.

* * * * *